United States Patent
Toshimitsu et al.

(10) Patent No.: US 7,244,892 B2
(45) Date of Patent: Jul. 17, 2007

(54) FLAME RETARDANT ETHYLENE FAMILY RESIN COMPOSITE AND FLAME RETARDANT ELECTRIC WIRE OR CABLE

(75) Inventors: Jun Toshimitsu, Oita (JP); Jun Suzuki, Matsudo (JP)

(73) Assignee: Fujikura, Ltd., Tokyo (JP)

( * ) Notice: Subject to any disclaimer, the term of this patent is extended or adjusted under 35 U.S.C. 154(b) by 106 days.

(21) Appl. No.: 11/223,963

(22) Filed: Sep. 13, 2005

(65) Prior Publication Data

US 2006/0014859 A1    Jan. 19, 2006

Related U.S. Application Data

(62) Division of application No. 10/712,998, filed on Nov. 17, 2003, now Pat. No. 6,995,198.

(30) Foreign Application Priority Data

Nov. 19, 2002  (JP)  ............... P2002-335729

(51) Int. Cl.
   *H01B 7/00*  (2006.01)
(52) U.S. Cl. .............. 174/68.1; 174/110 R; 174/121 A
(58) Field of Classification Search ............... 174/68.1, 174/110 R, 121 A
   See application file for complete search history.

(56) References Cited

U.S. PATENT DOCUMENTS

| | | |
|---|---|---|
| 4,098,762 A | 7/1978 | Miyata et al. |
| 4,671,896 A | 6/1987 | Hasegawa et al. |
| 5,317,051 A | 5/1994 | Harashige et al. |
| 5,889,087 A | 3/1999 | Hayashi et al. |
| 6,043,306 A | 3/2000 | Imahashi |
| 6,107,413 A | 8/2000 | Mori |
| 6,277,908 B1 | 8/2001 | Yamamoto |
| 6,414,059 B1 | 7/2002 | Kobayashi et al. |
| 6,492,453 B1 | 12/2002 | Ebrahimian et al. |
| 6,699,925 B2 | 3/2004 | Hatanaka et al. |
| 6,755,995 B1 | 6/2004 | Hasegawa et al. |

| | | |
|---|---|---|
| 2001/0025720 A1 | 10/2001 | Bisleri et al. |

FOREIGN PATENT DOCUMENTS

| | | |
|---|---|---|
| CN | 1070061 A | 3/1993 |
| EP | 1 092 751 A1 | 4/2001 |
| EP | 1 106 648 A1 | 6/2001 |
| JP | H05-054723 A | 3/1993 |
| JP | 08-113712 A | 5/1996 |
| JP | 2000-026664 A | 1/2000 |
| JP | 2000-212346 A | 8/2000 |
| JP | 2000-239459 A | 9/2000 |
| JP | 2000248126 A | 9/2000 |
| JP | 2000-327861 A | 11/2000 |
| JP | 2000-327862 A | 11/2000 |
| JP | 2000-327863 A | 11/2000 |
| JP | 2000336215 A | 12/2000 |
| JP | 2001-329141 A | 11/2001 |
| JP | 2001-335665 A | 12/2001 |
| JP | 2002-332384 A | 11/2002 |
| JP | 2002-371160 A | 12/2002 |
| WO | WO 99/05688 A1 | 2/1999 |
| WO | WO 01/39212 A1 | 5/2001 |

OTHER PUBLICATIONS

Kimura, Kazushi et al. "Halogen-Free Fire Resistant Polyolefin Compositions for Fire-Resistant Electric Wire Covering", XP002293628, retrieved from STN Database accession No. 2001:873309 *abstract* & Japan 335702 A (Hitachi Cable, Ltd., Japan) Dec. 4, 2001 (abstract only).

*Primary Examiner*—Bernard Lipman
(74) *Attorney, Agent, or Firm*—Sughrue Mion, PLLC

(57) ABSTRACT

A dispersion medium (31) composed as a mixture of EVA and EEA has therein a dispersion system of flame retardant particles (R1) including magnesium hydroxide treated with polyorganosiloxane, so that polyorganosilane (41) is dispersed with an equal uniformity to a flame retardant agent (40) containing magnesium hydroxide, thereby allowing a resultant flame retardant resin composite (CR1) to have a high flame retardancy, enabling prevention of the emission of smoke in great quantities or that of detrimental gases, such as halogen gases, when burnt, while having a specific gravity of 1.14 or less, enabling the separation by specific gravity difference, and this (CR1) is used as a covering material (12) for an electric wire (10) or cable (20) to be high in flame retardancy.

16 Claims, 3 Drawing Sheets

US 7,244,892 B2

FLAME RETARDANT ETHYLENE FAMILY RESIN COMPOSITE AND FLAME RETARDANT ELECTRIC WIRE OR CABLE

This is a divisional of application Ser. No. 10/712,998 filed Nov. 17, 2003, now U.S. Pat. No. 6,995,198. The entire disclosure of the prior application, application Ser. No. 10/712,998 is hereby incorporated by reference.

BACKGROUND OF THE INVENTION

1. Field of the Invention

The present invention relates to a flame retardant ethylene family resin composite suitable for coverage of electric wires or cables, and a flame retardant electric wire or cable using the composite.

2. Description of the Related Art

Electric wires or cables, requiring the prevention of the emission of smoke as well as detrimental halogen gases due to the spread of fire, have materials covering their conductors composed, typically, by evenly mixing, in (an) ethylene family base polymer(s), a flame retardant agent containing a halogen-free metal hydrate. In cases requiring a high flame retardancy, e.g. to JIS (Japanese Industrial Standard) C3005 (60-degree inclination burning test), an assisting flame retardant agent suitable to the flame retardant agent is added.

Flame retardant agents containing magnesium hydroxide exhibit good flame retardancy. As an assisting flame retardant agent suitable to those agents, polyorganosilane is known. However, this is liquid, and thus unable to be so evenly dispersed as those, thus causing seam cracks.

Japanese Patent Application Laying-Open Publication No. 8-113712 has disclosed a method of mixing polyorganosilane and silica powder to obtain silicone polymer powder that can flow with ease, and employing this as an assisting flame retardant agent.

This method is depicted in FIG. 9, where a flame retardant agent R10 composed by magnesium hydroxide 100 covered with stearic acid or ammonium molybdate 101 and an assisting flame retardant agent R11 composed by silicon oxide 110 covered with polyorganosilane 111 are blended in a base polymer.

Polyorganosilane 111 can thus be relatively easily dispersed. It however is not easy to disperse this as uniformly as the flame retardant agent R10.

SUMMARY OF THE INVENTION

The present invention has been made from such a point of view. It therefore is an object of the invention to provide a flame retardant ethylene family resin composite allowing for polyorganosilane to be dispersed with an equal uniformity to a flame retardant agent.

To achieve the object, according to an aspect of the invention, a flame retardant ethylene family resin composite comprises flame retardant particles dispersed in an ethylene family copolymer, each respectively having a flame retardant agent including magnesium hydroxide and polyorganosilane.

According to this aspect, the flame retardant agent including magnesium hydroxide and polyorganosilane are both contained in each flame retardant particle, and can be dispersed with an equal uniformity in the ethylene family copolymer.

According to another aspect of the invention, a flame retardant electric wire or cable comprises a conductor, and a covering material covering the conductor, the covering material comprising a flame retardant ethylene family resin composite according to the above-noted aspect.

BRIEF DESCRIPTION OF THE DRAWINGS

The above and other objects, features, and advantages of the invention will become fully apparent when the following preferred embodiments of the invention are read in conjunction with the accompanying drawings, in which.

DETAILED DESCRIPTION OF THE PREFERRED EMBODIMENTS

Figure 1:
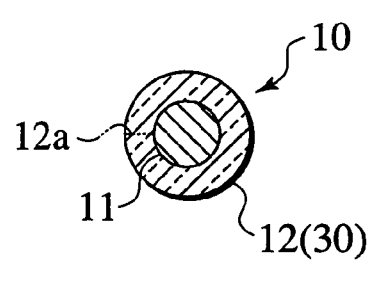
FIG. 1 is a section of a flame retardant electric wire of which a covering material is formed as an extrusion of a flame retardant ethylene family resin composite according to a first embodiment of the invention.

There will be described the preferred embodiments of the invention, with reference made to the accompanying drawings, in which like elements are designated by like reference characters.

Description is first made of a flame retardant ethylene family resin composite CR1 according to the first embodiment of the invention, and configuration of a flame retardant electric wire 10 and a flame retardant cable 20 using the resin composite CR1 as their covering materials, with reference to FIGS. 1 to 4. FIG. 1 is a section of the electric wire 10, FIG. 2, a section of the cable 20, FIG. 3, a section showing an extrusion-molded state 30 of the composite CR1, and FIG. 4, an enlarged diagram of an essential part of FIG. 3.

The electric wire 10 is configured with a copper-make good electric conductor 11, and a flame retardant covering material 12 as an insulator covering the conductor 11. The covering material 12 is made of the ethylene family resin composite CR1 heated and extruded on the conductor 11, as a seamless article to be free of joints 12a (phantom lines) in the molded state 30.

The cable 20 is configured with electric wires 10 . . . arranged in parallel, and a flame retardant covering material 22 as a common insulator covering the electric wires 10 . . . . Also the covering material 22 is made of the ethylene family resin composite CR1 heated and extruded on the wires 10 . . . , as a seamless article to be free of joints 22a (phantom lines) in the molded state 30.

In this state 30, the resin composite CR1 is composed, like before the extrusion, physically, by a dispersion medium 31 made of a base polymer, and combination of a uniform dispersion system 32 of flame retardant particles R1 and a uniform dispersion system 33 of preservative particles each respectively residing in the dispersion medium 31, and chemically, is produced by blending the flame retardant particles R1 and preservative particles in the base polymer.

Each flame retardant particle R1 is composed, physically, by a flame retardant agent 40 as a core thereof, and an assisting flame retardant agent 41 covering that agent 40 from the outside. The flame retardant agent 40 is made of magnesium hydroxide 40a, but may have a process assisting agent (e.g. stearic acid) 40b adhering thereto from the outside if this agent 40b is used. The assisting flame retardant agent 41 is made of polyorganosilane.

Chemically, the flame retardant particle R1 is obtained by treating the flame retardant agent 40 with polyorganosiloxane. It is noted that the flame retardant particle R1 may be deemed as a flame retardant agent.

Table-1 shows exemplary composition of resin composite CR1.

TABLE 1

Exemplary composition of resin composite CR1

| Physical Composition | Chemical Composition |
| --- | --- |
| Dispersion medium 31 | Ethylene family copolymer as mixture of EVA and EEA |
| Dispersion system 32 | Polyorganosiloxane-treated magnesium hydroxide (free of preservative agent) |
| Dispersion system 33 | Anti-aging agent |

Of resin composite CR1, the composition and proportion were varied for experiments A to D on flame retardancy, of which results are listed in Table-2 below.

As shown in Table-2, in experiment A which blended, to a base polymer composed by 20 parts in weight of EVA (ethylene vinyl acetate copolymer) and 80 parts in weight of EEA (ethylene ethyl acrylate copolymer), 45 parts in weight of polyorganosiloxane-treated magnesium hydroxide and 1 part in weight of anti-aging agent and experiment D which blended, to an identical base polymer, 120 parts in weight of magnesium hydroxide and 1 part in weight of anti-aging agent, corresponding resin composites CR1 had conforming results in a flame retardancy test to JIS C3005. Moreover, in the former A, the resin composite CR1 had a specific gravity of 1.14 suitable for automatic separation from a conventional general-purpose article.

However, in experiments B and C in which the amount of magnesium hydroxide in experiment D was changed to 45 parts and 100 parts in weight, respectively, the flame retardancy test gave nonconforming results. It is to be noted that the above-noted experiments are shown for illustrative purposes, and are not restrictive.

TABLE 2

Results of flame retardancy experiments of resin composite CR1

| | Experiment A | Experiment B | Experiment C | Experiment D |
| --- | --- | --- | --- | --- |
| EVA[1] | 20 | 20 | 20 | 20 |
| EEA[2] | 80 | 80 | 80 | 80 |
| Magnesium hydroxide[3] | 45 | | | |

TABLE 2-continued

Results of flame retardancy experiments of resin composite CR1

| | Experiment A | Experiment B | Experiment C | Experiment D |
| --- | --- | --- | --- | --- |
| Magnesium hydroxide[4] | | 45 | 100 | 120 |
| Anti-aging agent[5] | 1 | 1 | 1 | 1 |
| Flame retardancy test | Conforming | Non-conforming | Non-conforming | Conforming |
| Specific gravity | 1.14 | 1.14 | 1.4 | 1.5 |

[1] EV-460 (Du Pont-Mitsui Polychemicals Co., Ltd.), VA 20%, MI 2.5
[2] A-710 (Du Pont-Mitsui Polychemicals Co., Ltd.), EA 15%, MI 0.5
[3] KISUMA 5A (Kyowa Chemical Industry Co,. Ltd.), Polyorganosiloxane-treated 6%
[4] KISUMA 5A (Kyowa Chemical Industry Co,. Ltd.)
[5] IRGANOX 1010 (Ciba-Geigy Japan Ltd.) or eq.

Figure 5:
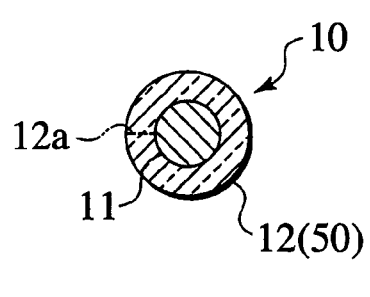
FIG. 5 is a section of a flame retardant electric wire of which a covering material is formed as an extrusion of a flame retardant ethylene family resin composite according to a second embodiment of the invention.

Description is now made of a flame retardant ethylene family resin composite CR2 according to the second embodiment of the invention, and configuration of a flame retardant electric wire 10 and a flame retardant cable 20 using the resin composite CR2 as their covering materials, with reference made to FIGS. 5 to 8. FIG. 5 is a section of the electric wire 10, FIG. 6, a section of the cable 20, FIG. 7, a section showing an extrusion-molded state 50 of the composite CR2, and FIG. 8, an enlarged diagram of an essential part of FIG. 7.

Figure 2:
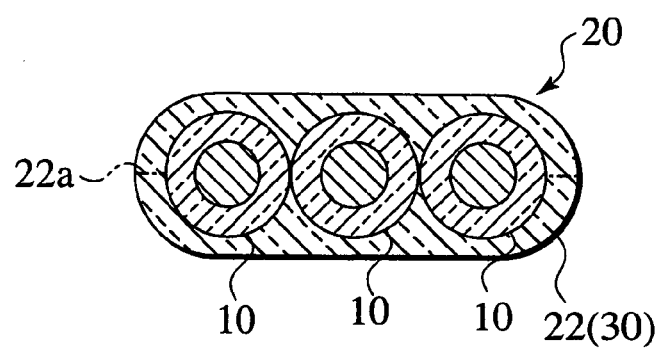
FIG. 2 is a section of a flame retardant cable of which a covering material is formed as an extrusion of the flame retardant ethylene family resin composite according to the first embodiment.
Figure 3:
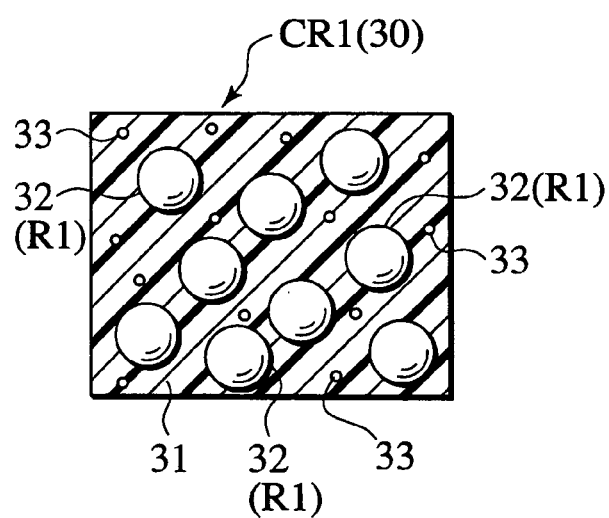
FIG. 3 is a section showing an extrusion-molded state of the flame retardant ethylene family resin composite according to the first embodiment.
Figure 4:
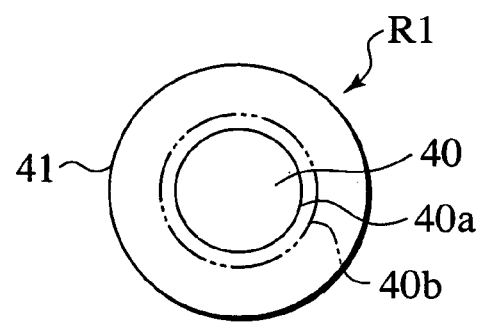
FIG. 4 is an enlarged diagram of one of flame retardant particles dispersed in the resin composite of FIG. 3.
Figure 6:
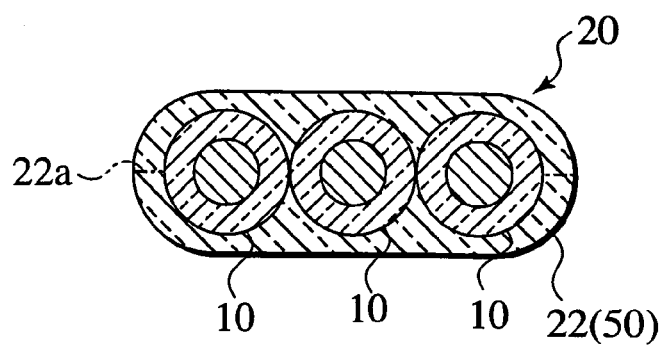
FIG. 6 is a section of a flame retardant cable of which a covering material is formed as an extrusion of the flame retardant ethylene family resin composite according to the second embodiment.
Figure 7:
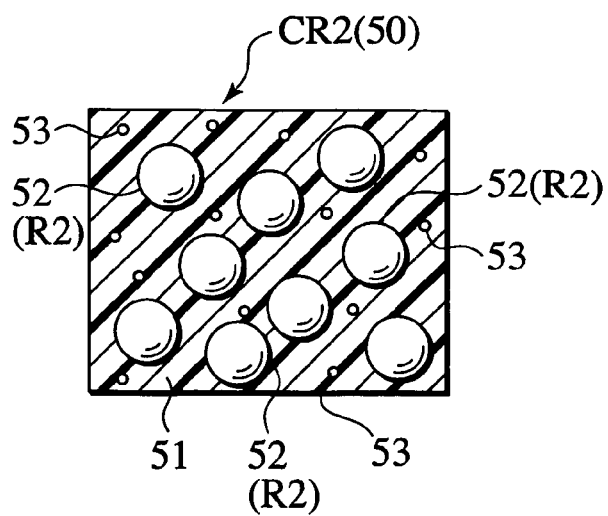
FIG. 7 is a section showing an extrusion-molded state of the flame retardant ethylene family resin composite according to the second embodiment.
Figure 8:
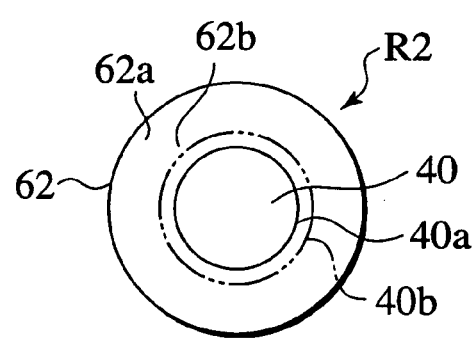
FIG. 8 is an enlarged diagram of one of flame retardant particles dispersed in the resin composite of FIG. 7.
Figure 9:
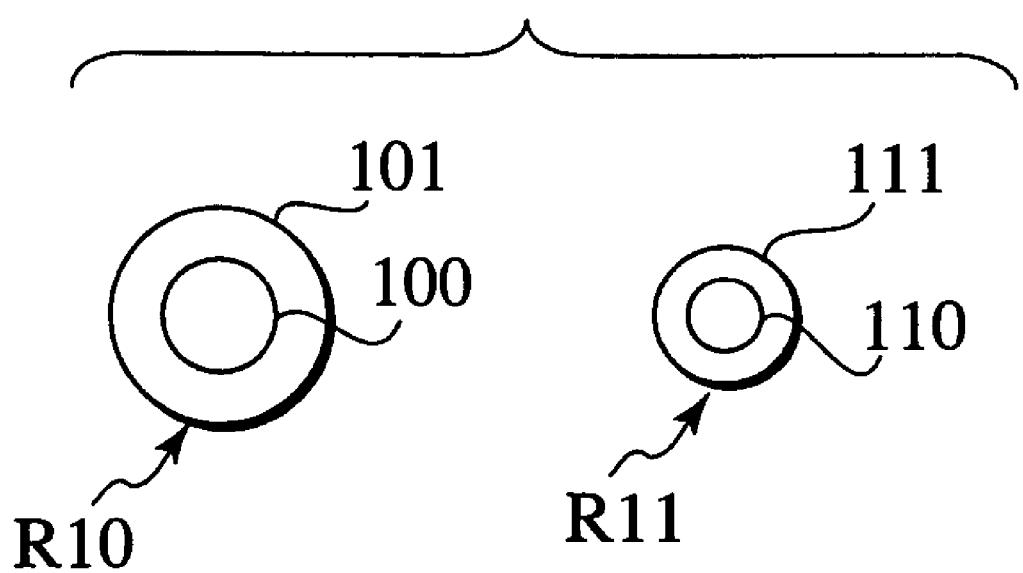
FIG. 9 is a diagram showing a conventional method.

The electric wire 10 and cable 20 shown in FIGS. 5 and 6 are different from FIGS. 1 and 2 in that their covering materials 12, 22 are formed in the extrusion-molded state 50 of resin composite CR2, but not of CR1.

In this state 50, the resin composite CR2 is composed, like before the extrusion, physically, by a dispersion medium 51 made of a base polymer, and combination of a uniform dispersion system 52 of flame retardant particles R2 and a uniform dispersion system 53 of preservative particles each respectively residing in the dispersion medium 51, and chemically, is produced by blending the flame retardant particles R2 and preservative particles in the base polymer.

Each flame retardant particle R2 is composed, physically, by a flame retardant agent 40 as a core thereof, and an assisting flame retardant agent 62 covering that agent 40 from the outside. The flame retardant agent 40 is made of magnesium hydroxide 40a, but may have a process assisting agent (e.g. stearic acid) 40b adhering thereto from the outside if this agent 40b is used. The assisting flame retardant agent 62 is formed as an involving or mixed composition of a first assisting flame retardant agent 62a comprised of aluminum hydroxide, ammonium molybdate-treated aluminum hydroxide, silicon powder, red phosphorus, or the like, and a second assisting flame retardant agent 62b comprised of polyorganosilane.

Chemically, the flame retardant particle R2 is obtained by: addition of the first assisting flame retardant agent 62a to the flame retardant agent 40, followed by treatment by polyorganosiloxane; or treatment of the flame retardant agent 40 by polyorganosiloxane, and concurrent addition of the first assisting flame retardant agent 62a; or treatment of the flame retardant agent 40 by polyorganosiloxane, followed by addition of the first assisting flame retardant agent 62a. Combination of the flame retardant agent 40 and the first or second assisting flame retardant agent 62a o 62b may be deemed as a flame retardant agent. The flame retardant particle R2 may also be deemed as a flame retardant agent.

Table-3 shows exemplary composition of resin composite CR2.

Of resin composite CR2, the composition and proportion were varied for experiment-1 to experiment-30 on flame retardancy, of which results are listed in Table-4 and Table-5.

TABLE 3

Exemplary composition of resin composite CR2

| Physical Composition | Chemical Composition |
| --- | --- |
| Dispersion medium 51 | Ethylene family copolymer as mixture of EVA and EEA |
| Dispersion system 52 | Polyorganosiloxane-treated magnesium hydroxide First assisting flame retardant agent (aluminium hydroxide, ammonium molybdate-treated aluminium hydroxide, silicon powder, red phosphorus, etc.) Preservative agent (stearic acid) |
| Dispersion system 53 | Anti-aging agent |

Description is now made of the composition and proportion of resin composite CR2, with reference to experiments-J (J=1 to 15) of Table-4 and experiments-K (K=16 to 30) of Table-5, in which each experiment-J corresponds in composition to experiment-K=J+15. It is to be noted that experiments-J and experiments-K were made for illustrative purposes, and are not restrictive.

Resin composite CR2 is produced as a flame retardant ethylene family resin composite which has blended, to 100 parts in weight (see experiments-1 to 15 and 16 to 30) of ethylene family copolymer (base polymer 31, preferably EVA+EEA, see experiments-2 to 15 and 17 to 30), 40 to 50 parts in weight of polyorganosiloxane-treated magnesium hydroxide (flame retardant agent 40, see experiments-1 to 13 and 16 to 28) and 2 to 10 parts in weight of an assisting flame retardant agent 41 (see experiments-1 to 7 and 16 to 22 excluding red phosphorus, and experiments-8 to 9 and 23 to 24 including red phosphorus).

Resin composite CR2 has a high flame retardancy (see experiments-17 to 24) conforming to JIS C3005 (60-degree inclination burning test) so that it does not emit smoke in great quantities due to burning, and even if burnt, it does not emit detrimental halogen gases. Moreover, resin composite CR2 has a low specific gravity of 1.14 or less (see experiments-1 to 9) that allows a separation by specific gravity difference from conventional general-purpose covering materials (e.g. poly-vinyl chloride resin). Further, unless red phosphorus that has been frequently used (see experiments-8 to 9 and 21 to 22) is used as an assisting flame retardant agent, the resin composite can be free from coloring by red phosphorus (see experiments-1 to 7).

TABLE 4

(20020710): Experiments-J (J = 1~15)

| | Exp. 1 | Exp. 2 | Exp. 3 | Exp. 4 | Exp. 5 | Exp. 6 | Exp. 7 | Exp. 8 |
| --- | --- | --- | --- | --- | --- | --- | --- | --- |
| EVA[1] | | 20 | 40 | 20 | 40 | 20 | 40 | 20 |
| EEA[2] | 100 | 80 | 60 | 80 | 60 | 80 | 60 | 80 |
| Magnesium hydroxide[3] | 45 | 40 | 50 | 40 | 50 | 40 | 50 | 40 |
| Aluminium hydroxide[4] | 10 | 10 | 2 | | | | | |
| Molybdate-treated aluminium hydroxide[5] | | | | 10 | 2 | | | |
| Silicon powder[6] | | | | | | 10 | 5 | |
| Red phosphorus | | | | | | | | 5 |
| Stearic acid | 2 | 2 | 5 | 2 | 5 | 2 | 5 | 2 |
| Anti-aging agent[7] | 1 | 1 | 1 | 1 | 1 | 1 | 1 | 1 |
| Specific gravity | 1.14 | 1.13 | 1.14 | 1.14 | 1.14 | 1.14 | 1.14 | 1.12 |
| Disruptive strength (MPa) | 15 | 15 | 15 | 14 | 15 | 14 | 15 | 17 |
| Elongation (%) | 600 | 600 | 600 | 500 | 600 | 600 | 600 | 600 |
| Coloring property | o | o | o | o | o | o | o | x |

| | Exp. 9 | Exp. 10 | Exp. 11 | Exp. 12 | Exp. 13 | Exp. 14 | Exp. 15 |
| --- | --- | --- | --- | --- | --- | --- | --- |
| EVA[1] | 40 | 20 | 20 | 20 | 20 | 20 | 20 |
| EEA[2] | 60 | 80 | 80 | 80 | 80 | 80 | 80 |
| Magnesium hydroxide[3] | 50 | 45 | 45 | 45 | 45 | 100 | 100 |
| Aluminium hydroxide[4] | | 15 | 1 | | | | |
| Molybdate-treated aluminium hydroxide[5] | | | | 1 | 15 | | |
| Silicon powder[6] | | | | | | | |
| Red phosphorus | 5 | | | | | | |
| Stearic acid | 2 | 5 | 5 | 2 | 5 | 2 | 5 |
| Anti-aging agent[7] | 1 | 1 | 1 | 1 | 1 | 1 | 1 |
| Specific gravity | 1.14 | 1.2 | 1.14 | 1.14 | 1.3 | 1.4 | 1.4 |
| Disruptive strength (MPa) | 14 | 12 | 15 | 15 | 13 | 12 | 12 |

TABLE 4-continued (20020710): Experiments-J (J = 1~15)

| Elongation (%) | 500 | 500 | 500 | 500 | 500 | 400 | 400 |
|---|---|---|---|---|---|---|---|
| Coloring property | x | ○ | ○ | ○ | ○ | ○ | ○ |

[1)]EV-460 (Du Pont-Mitsui Polychemicals Co., Ltd.), VA 20% MI 2.5
[2)]A-710 (Du Pont-Mitsui Polychemicals Co., Ltd.), EA 15%, MI 0.5
[3)]KISUMA 5A (Kyowa Chemical Industry Co,. Ltd.), polyorganosiloxane-treated 6%
[4)]HIGILITE H42S (Showa Denko K.K.)
[5)]BOENSKR803 (Kikuchi Color & Chemicals Corporation)
[6)]DC4-7081 (Dow Corning Toray Silicone Co., Ltd.)
[7)]Irganox 1010 (Ciba-Geigy Japan Ltd.) or eq.

TABLE 5

(20020710): Experiments-K (K = 16~30; corresponding to J + 15)

| | Exp. 16 | Exp. 17 | Exp. 18 | Exp. 19 | Exp. 20 | Exp. 21 | Exp. 22 | Exp. 23 |
|---|---|---|---|---|---|---|---|---|
| EVA[1)] | | 20 | 40 | 20 | 40 | 20 | 40 | 20 |
| EEA[2)] | 100 | 80 | 60 | 80 | 60 | 80 | 60 | 80 |
| Magnesium hydroxide[3)] | 45 | 40 | 50 | 40 | 50 | 40 | 50 | 40 |
| Aluminium hydroxide[4)] | 10 | 10 | 2 | | | | | |
| Molybdate-treated Aluminium hydroxide[5)] | | | | 10 | 2 | | | |
| Silicon powder[6)] | | | | | | 10 | 5 | |
| Red phosphorus | | | | | | | | 5 |
| Stearic acid | 2 | 2 | 5 | 2 | 5 | 2 | 5 | 2 |
| Anti-aging agent[7)] | 1 | 1 | 1 | 1 | 1 | 1 | 1 | 1 |
| Flame retardancy | Non-conforming | Conforming | Conforming | Conforming | Conforming | Conforming | Conforming | Conforming |
| Anti-flaw property | ○ | ○ | ○ | ○ | ○ | ○ | ○ | ○ |

| | Exp. 24 | Exp. 25 | Exp. 26 | Exp. 27 | Exp. 28 | Exp. 29 | Exp. 30 |
|---|---|---|---|---|---|---|---|
| EVA[1)] | 40 | 20 | 20 | 20 | 20 | 20 | 20 |
| EEA[2)] | 60 | 80 | 80 | 80 | 80 | 80 | 80 |
| Magnesium hydroxide[3)] | 50 | 45 | 45 | 45 | 45 | 100 | 100 |
| Aluminium hydroxide[4)] | | 15 | 1 | | | | |
| Molybdate-treated Aluminium hydroxide[5)] | | | | 1 | 15 | | |
| Silicon powder[6)] | | | | | | | |
| Red phosphorus | 5 | | | | | | |
| Stearic acid | 2 | 5 | 5 | 2 | 5 | 2 | 5 |
| Anti-aging agent[7)] | 1 | 1 | 1 | 1 | 1 | 1 | 1 |
| Flame retardancy | Conforming | Conforming | Non-conforming | Non-conforming | Conforming | Non-conforming | Non-conforming |
| Anti-flaw property | ○ | ○ | ○ | ○ | ○ | ○ | ○ |

[1)]EV-460 (DuPont-Mitsui Polychemicals Co., Ltd.), VA 20% MI 2.5
[2)]A-710 (Du Pont-Mitsui Polychemicals Co., Ltd.), EA 15%, MI 0.5
[3)]KISUMA 5A (Kyowa Chemical Industry Co,. Ltd.), polyorganosiloxane-treated 6%
[4)]HIGILITE H42S (Showa Denko K.K.)
[5)]BOENSKR803 (Kikuchi Color & Chemicals Corporation)
[6)]DC4-7081 (Dow Corning Toray Silicone Co., Ltd)
[7)]Irganox 1010 (Ciba-Geigy Japan Ltd.) or eq.

In other words, in a molded state 30, resin composite CR2 (see experiments-1 to 7 and 17 to 22) is of high flame retardancy, good at mechanical properties, suitable for separation by specific gravity difference in waste disposal, and favorable to the environment.

The base polymer of resin composite CR2 may well be a polymer of poly-ethylene resin {e.g. LDPE (low-density poly-ethylene), VLDPE (very low-density poly-ethylene), LLDPE (normal-chained low-density poly-ethylene)} or ethylene family resin {e.g. PP (polypropylene)}, ethylene family copolymer {e.g. EVA (ethylene vinyl acetate copolymer), EEA (ethylene ethyl acrylate copolymer), EPR/EPDM (ethylene propylene copolymer), EBA (ethylene butyl acrylate copolymer), EMMA (ethylene methyl meta-acrylate copolymer)}, or an arbitrary mixture therebetween. It may preferably be prepared as a mixture of EVA (ethylene vinyl acetate copolymer) that promotes carbonization when burning, and EEA (ethylene ethyl acrylate copolymer) that forms a char when burning.

More specifically, the base polymer is made as a mixture of 20 to 40 parts in weight of EVA and 80 to 60 parts in weight of EEA (see experiments-2 to 7 and 17 to 22). Mixtures of less than 20 parts in weight of EVA and more than 80 parts in weight of EEA tend to have contracted chars, and mixtures of more than 40 parts in weight of EVA and less than 60 parts in weight of EEA tend to drip when burning.

For use as the flame retardant agent of resin composite CR2, magnesium hydroxide is surface-treated by polyorganosiloxane, and added in a proportion of 40 to 50 parts in weight to 100 parts in weight of base polymer (see experiments-1 to 13 and 16 to 28).

When surface-treated by polyorganosiloxane, magnesium hydroxide has an enhanced flame retardancy. It can prevent reactions with moisture or carbon dioxide, thus allowing for extrusion-molded articles to be free from degradation in appearance due to generation of white magnesium carbonate (see experiments-1 to 7 and 10 to 15).

For the surface treatment, polyorganosiloxane may preferably be controlled in quantity within a range of approx. 5% to approx. 9% in weight of magnesium hydroxide.

Resin composite CR2, in which to 100 parts in weight of base polymer are added 40 to 50 parts in weight of magnesium hydroxide relatively low of specific gravity, has an as low specific gravity as 1.14 or less (see experiments-1 to 9 and 11 to 12), allowing separation by specific gravity difference from a generally used vinyl chloride resin.

Resin composite CR2 employs aluminum hydroxide (see experiments-1 to 5 and 10 to 13) or, preferably, ammonium molybdate-treated aluminum hydroxide (see experiments-4 to 5 and 12 to 13), as an assisting flame retardant agent to be blended by 2 to 10 parts in weight thereof to 100 parts in weight of ethylene family copolymer (base polymer 31).

It is thereby allowed to have such a high flame retardancy as polyorganosiloxane would be unable to solely achieve, without increasing the specific gravity of resin composite CR2, and without degrading mechanical properties.

Aluminum hydroxide subjected to a surface treatment with a molybdate (preferably, ammonium molybdate) is adapted by heat-absorbing molybdenum, to enhance the flame retardancy of resin composite CR2, more than aluminium hydroxide not subjected to the surface treatment. This surface treatment is effected by dipping aluminium hydroxide in a solution of molybdate (preferably, ammonium molybdate).

If the quantity of addition of aluminium hydroxide is less than two parts in weight (see experiments-11 to 12 and 26 to 27), resultant resin composite CR2 has an insufficient flame retardancy. If it is more than 10 parts in weight (see experiments-10, 13, 25, and 28), the quantity of addition of magnesium hydroxide (flame retardant agent 40) becomes short in terms of specific gravity.

Resin composite CR2 may use, as its assisting flame retardant agent, aluminium hydroxide, poly-ammonium phosphate, melamine powder, melamine cyanurate, or zinc borate alone or in combination.

Resin composite CR2 may use silicon powder as well (see experiments-6 to 7 and 21 to 22) as its assisting flame retardant agent to achieve like effects or characteristics. However, silicon powder has influences on the extrusion workability of resin composite CR2, as the specific gravity is increased, and should be as small as possible in addition quantity. Preferably, it should be 3 to 8 parts in weight (see experiments 7 and 22) to 100 parts in weight of base polymer.

The foregoing assisting flame retardant agents may well be concurrently used within a range of 2 to 10 parts in weight.

Resin composite CR2 can have a sufficient extrusion workability to cope with high production rate, by addition of 0.5 to 5.0 parts in weight of process assisting agent 40b (see experiments-1 to 3 and 5 to 7). More specifically, by adding 0.5 to 5.0 parts in weight of stearic acid, fatty acid ester, or the like to 100 parts in weight of base polymer, the production rate can be increased by 5% or near from a non-added state.

Experiments-J gave, for corresponding composites, results of tests on specific gravity, disruptive strength (MPa), elongation (%), and coloring. The specific gravity was measured to JIS K7112, the elongation (%), to JIS C3005, and the disruptive strength (MPa), to JIS C3005. The proportion is shown in the Table, in terms of part in weight.

As is apparent from Table-4, if the base polymer is an ethylene family copolymer (see experiments-1 to 9), resultant specific gravity, disruptive strength and elongation can be desirable. Such mechanical properties are achieved in cases in which the base polymer is made of a mixture of EVA and EEA (see experiments-2 to 9), in particular when it is a mixture of 20 to 40 parts in weight of EVA and 80 to 60 parts in weight of EEA, by blending, to 100 parts in weight of the mixture, 40 to 50 parts in weight of magnesium hydroxide surface-treated with polyorganosiloxan (flame retardant agent 40) and 2 to 10 parts in weight of assisting flame retardant agent 41. However, as in experiments-8 and 9, if the assisting flame retardant agent used is red phosphorus, the coloring suffers a restricted range of selection. Aluminium hydroxide, aluminium hydroxide surface-treated with molybdate, or silicon powder can serve as a useful assisting flame retardant agent. Such resin composites CR1 and CR2 have a specific gravity of 1.14 or less, a disruptive strength (MPa) of 10 or more, and an elongation (%) of 350 or more. Experiments-14 and 15 had magnesium hydroxide added as much as 100 parts in weight, resulting in an undesirable specific gravity exceeding 1.14.

Experiments-K revealed, for electric wires or cables using correspondent composites, their flame retardancy and anti-flaw property. For flame retardancy, the composite was extruded over a copper conductor of an outside diameter of 1.6 mm, with a covering thickness of 0.8 mm, thereby fabricating a flame retardant electric wire, which was decided to be conforming or not by a 60-degree inclination burning test to JIS C3005. Self extinction within 30 seconds after firing of the electric wire was decided to be conforming. For anti-flaw property, a stainless steel—make needle of an outside diameter of 0.45 mm was loaded 72 g in a scrape test using an NEMA (National Electrical Manufacturers Association) reciprocal scrape tester, where its conduction to conductor started after a number of times of reciprocation, which was measured for decision on conformity or nonconformity. The number of times of reciprocation was decided to be conforming (round-mark), in excess of 10 times.

As is apparent from Table-5, experiments-16 to 30 passed the anti-flaw test, and experiments-17 to 25 and 28 passed the flame retardancy test. Experiments-23 and 24 had a covering insulation layer colored with red phosphorus, to be unsuitable to some applications. Experiments-29 and 30 had a covering insulation layer greater than 1.14 in specific gravity, thus constituting the difficulty of separation by specific gravity difference. Experiments-17 to 22 passed the 60-degree inclination burning test, having a conforming flame retardancy to JIS C3005, and a disruptive strength of 10 MPa or more, as well as an elongation of 350% or more, in addition to an excellent coloring and a sufficient anti-flaw property, and besides, the specific gravity of covering insulation layer was 1.14 or less, allowing a separation by specific gravity difference from poly-vinyl chloride resins. Further, they are allowed to prevent the emission of significant quantities of detrimental gases due to burning, favorable to the environment as well, and sufficiently adapted to function as internal and external wirings for electrical apparatuses and appliances, as well as for electronics.

The above-noted resin composites CR1 and CR2 contain preservatives such as an anti-aging agent, while having added typical coloring agents, fillers, ultraviolet ray protective agents, etc. within a desirable range of specific gravity.

The resin composites CR1 and CR2 are flame retardant, having low specific gravity, in addition to being small of smoke emission when burnt, and excellent in mechanical properties such as anti-abrasive property, flex withstanding property, and tensile strength (disruptive strength), in particular, in workability, so that they are useful as flame retardant covering materials 12, 22 of electric wire 10 and cable 20.

Resin composites CR1 and CR2 are adapted to be free from the emission of smoke in great quantities, as well as that of detrimental gases such as halogen gases, when burnt, thus allowing for the electric wire 10 or cable 20 covered with resin composite CR1 or CR2 to have a conforming flame retardancy to JIS C3005, that can pass the 60-degree inclination burning test. Resin composites CR1 and CR2, as they are 1.1.4 or less in specific gravity, allow for a separation to be effected by specific gravity difference from other plastic materials, in particular, from poly-vinyl chloride resins, when removing or disposing the electric wire 10 and/or cable 20. Moreover, when having blended no assisting flame retardant agent of phosphor family, they are kept from being thereby colored, with a commensurate spread in width of selection for coloring. Further, by addition of process assisting agent, they have an increased extrusion workability.

The electric wire 10 or cable 20 is useful for general electrical wiring, as well as for wiring of electronics. Electric wire 10 or cable 20 has resin composite CR1 or CR2 extruded, for covering, over a conductor 11 thereof made as a copper wire, copper-clad aluminium wire, copper-clad steel wire, etc. The thickness of coverage has a typical range of 0.5 mm to 1.8 mm. Resin composites CR1 and CR2 of electric wire 10 or cable 20 can be bridged or cross-linked by irradiation of electron beam, to have an enhanced heat resisting property. In addition, they can be thereby provided with an enhanced tensile strength as a comfortable mechanical property. Electric wire 10 and cable 20 have a sufficient flame retardancy to pass a 60-degree inclination burning test conforming to the JIS C3005. For mechanical properties, they have a disruptive strength so great as 10 MPa or more, and a flexibility as high as 30% in elongation, and an excellent anti-flaw property. Electric wire 10 and cable 20 using resin composite CR1 or CR2 are prevented from emitting smoke in great quantities, as well as from emitting detrimental gases such as halogen gases, when burnt.

The contents of Japanese Patent Application 2002-335729 are incorporated herein by reference.

While embodiments of the present invention have been described using specific terms, such description is for illustrative purposes, and it is to be understood that changes and variations may be made without departing from the spirit or scope of the following claims.

What is claimed is:

1. A flame retardant electric wire comprising: a conductor; and a covering material covering the conductor, the covering material comprising a flame retardant ethylene family resin composite comprising a flame retardant resin composite CR1; CR2) having a specific gravity of 1.14 or less, as a product of a process comprising the steps of:

preparing a flame retardant agent comprising
magnesium hydroxide, and
stearic acid adhering thereto;
providing a core element comprising the flame retardant agent;
surface-treating the core element by a polyorganosiloxane, thereby preparing a particle element having the core element coated with a polyorganosilane;
preparing a flame retardant particle comprising the particle element;
mixing an ethylene vinyl acetate copolymer and an ethylene ethyl acrylate copolymer, thereby preparing an ethylene family copolymer; and
preparing the flame retardant resin composite comprising
a dispersion medium comprising the ethylene family copolymer, and
a system of flame retardant particles evenly dispersed in the dispersion medium.

2. The flame retardant electric wire as claimed in claim 1, wherein the flame retardant particle comprises an assisting flame retardant agent provided about the flame retardant agent, the core element, or the particle element.

3. The flame retardant electric wire as claimed in claim 2, wherein the flame retardant resin composite contains 40 to 50 parts by weight of the particle element and 2 to 10 parts by weight of the assisting flame retardant agent, to 100 parts by weight of the ethylene family copolymer.

4. The flame retardant electric wire as claimed in claim 3, wherein the ethylene family copolymer comprises a mixture of 20 to 40 parts by weight of the ethylene vinyl acetate copolymer and 80 to 60 parts by weight of the ethylene ethyl acrylate copolymer.

5. The flame retardant electric wire as claimed in claim 2, wherein the assisting flame retardant agent comprises an aluminium hydroxide composite.

6. The flame retardant electric wire as claimed in claim 5, wherein the aluminium hydroxide composite comprises ammonium molybdate-treated aluminium hydroxide.

7. The flame retardant electric wire as claimed in claim 2, wherein the assisting flame retardant agent comprises silicon powder.

8. The flame retardant electric wire as claimed in claim 3, wherein the flame retardant resin composite further comprises 2 to 5 parts by weight of stearic acid.

9. A flame retardant electric cable comprising: a conductor; and a covering material covering the conductor, the covering material comprising a flame retardant ethylene family resin composite comprising a flame retardant resin composite having a specific gravity of 1.14 or less, as a product of a process comprising the steps of:

preparing a flame retardant agent comprising
magnesium hydroxide, and
stearic acid adhering thereto;
providing a core element comprising the flame retardant agent;
surface-treating the core element by a polyorganosiloxane, thereby preparing a particle element having the core element coated with a polyorganosilane;
preparing a flame retardant particle comprising the particle element;
mixing an ethylene vinyl acetate copolymer and an ethylene ethyl acrylate copolymer, thereby preparing an ethylene family copolymer; and preparing the flame retardant resin composite comprising
a dispersion medium comprising the ethylene family copolymer, and
a system of flame retardant particles evenly dispersed in the dispersion medium.

10. The flame retardant electric cable as claimed in claim 9, wherein the flame retardant particle comprises an assisting flame retardant agent provided about the flame retardant agent, the core element, or the particle element.

11. The flame retardant electric cable as claimed in claim 10, wherein the flame retardant resin composite contains 40 to 50 parts by weight of the particle element and 2 to 10 parts by weight of the assisting flame retardant agent, to 100 parts by weight of the ethylene ;Family copolymer.

12. The flame retardant electric cable as claimed in claim 11, wherein the ethylene family copolymer comprises a mixture of 20 to 40 parts by weight of the ethylene vinyl acetate copolymer and 80 to 60 parts by weight of the ethylene ethyl acrylate copolymer.

13. The flame retardant electric cable as claimed in claim 10, wherein the assisting flame retardant agent comprises an aluminum hydroxide composite.

14. The flame retardant electric cable as claimed in claim 13, wherein the aluminum hydroxide composite comprises ammonium molybdate-treated aluminum hydroxide.

15. The flame retardant electric cable as claimed in claim 10, wherein the assisting flame retardant agent comprises silicon powder.

16. The flame retardant electric cable as claimed in claim 11, wherein the flame retardant resin composite further comprises 2 to 5 parts by weight of stearic acid.

* * * * *